M. B. KORMAN.
RIM FOR PNEUMATIC TIRES.
APPLICATION FILED AUG. 9, 1916.
1,291,930.
Patented Jan. 21, 1919.
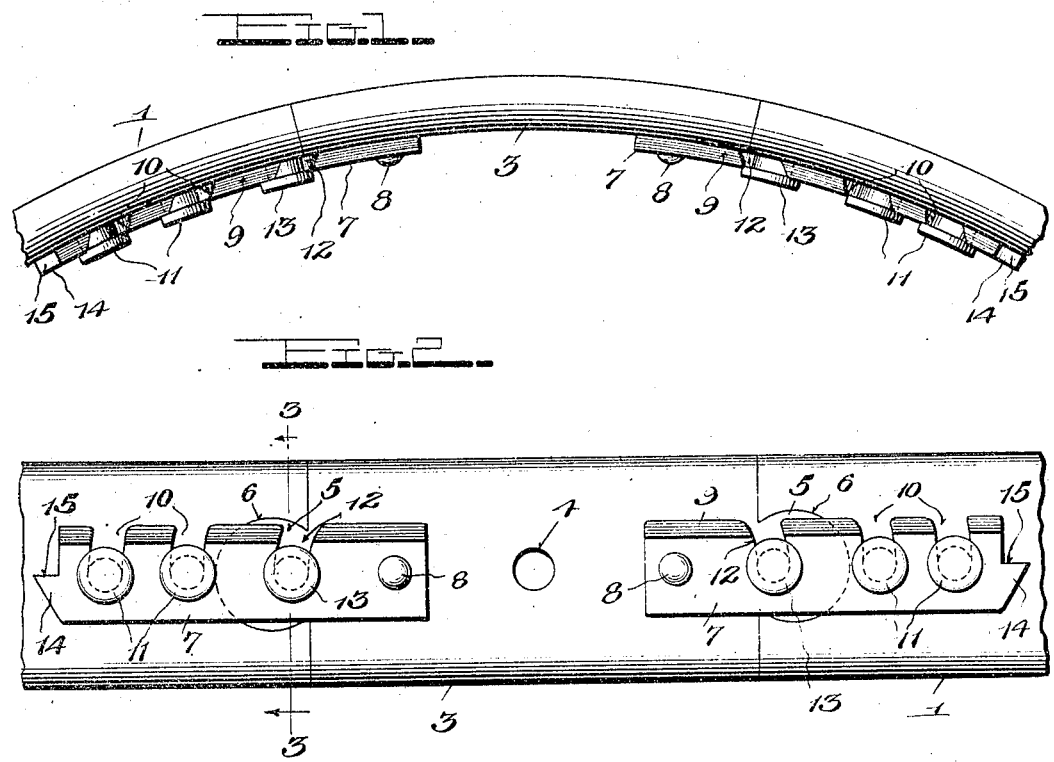
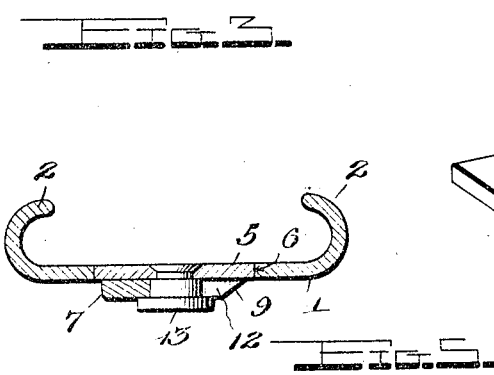
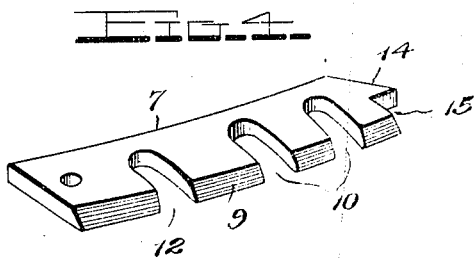
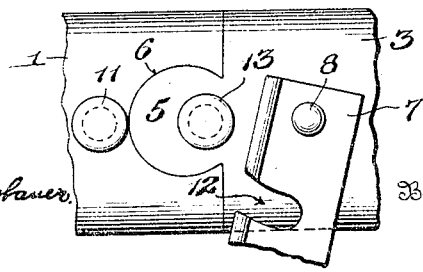
Inventor
Maurice B. Korman,

UNITED STATES PATENT OFFICE.

MAURICE B. KORMAN, OF WASHINGTON, DISTRICT OF COLUMBIA.

RIM FOR PNEUMATIC TIRES.

1,291,930.  Specification of Letters Patent.  Patented Jan. 21, 1919.

Application filed August 9, 1916. Serial No. 113,942.

*To all whom it may concern:*

Be it known that MAURICE B. KORMAN, a citizen of the United States, residing at Washington, District of Columbia, has invented certain new and useful Improvements in Rims for Pneumatic Tires; of which the following is a specification.

This invention relates to supporting rims for pneumatic tires.

While many attempts have heretofore been made to simplify the assembling and removal of pneumatic tires from their rims, and while many of these efforts have been successful to an appreciable extent, at the same time most of these supporting rims of the demountable type are of a character making necessary the expenditure of considerable labor in the application or removal of the tire therefrom, and it is one of the purposes of the present invention to provide a supporting rim, of an improved character over present devices, and largely overcoming such objections as have heretofore manifested themselves.

In carrying out the principle of the present invention, it is proposed to provide a rim having a cut-out part to form a gap to receive a section which, when in place constitutes in effect a continuous portion of the rim, and which at the same time may be readily removed, whereby to permit the tire to be readily applied to the body portion of the rim.

More particularly, the invention includes a rim having a cut-out part, a removable section to be positioned in said cut-out part, and novel and improved means of connection between said removable section and the body portion of the rim, said parts being constructed and arranged with a view to simplicity in design and construction, durability in use, and efficiency in operation.

One of the features of the invention resides in a novel and efficient locking means between the removable section and body portion of the rim, said means being readily movable into and out of locking position.

It is also contemplated by the invention to provide a direct interlocking engagement between the ends of the removable rim section and the adjacent ends of the body portion of the rim, which in addition to affording auxiliary retaining means between these parts, is designed to coöperate with the locking means previously described, to the end that the retaining means just described maintains the parts in position whereby the movable locking means may be readily moved into locking position.

Other and further improvements and novel details in the construction and arrangement of the various parts will be appreciated from the description to follow, which, for a clear understanding of the invention is to be considered in connection with the accompanying drawings, forming a part hereof and wherein is disclosed for the purpose of illustration, a convenient and satisfactory embodiment of the invention.

In the drawings:—

Figure 1 is a side elevation of a rim section with my improvements applied.

Fig. 2 is a plan view of the inner face of my improved rim, the body portion of the rim being cut away.

Fig. 3 is a transverse section substantially on the line 3—3 of Fig. 2.

Fig. 4 is a detail perspective of one of the movable locking devices for the removable section of the rim.

Fig. 5 is a detail of the interfitting connection between one end of the removable section and the adjacent end of the body portion of the rim, together with one of the locking devices out of locking position, parts being cut away.

With more particular reference to the drawings wherein like reference numerals refer to corresponding parts throughout the several views, 1 is a tire supporting rim preferably of the demountable type and having the usual side tire engaging flanges 2; the said rim 1 has an elongated cut-out part adapted for the reception of a removable rim section 3, which latter corresponds in shape and design to the body portion of the rim 1, and has a central aperture 4 for the reception of the usual valve stem of the pneumatic tire to be applied to said rim. The adjacent ends of the removable section 3, and the body portion of the rim 1 are constructed whereby to provide an interfitting or interlocking engagement therebetween, and in that embodiment of the invention illustrated, the removable section 3 is provided with tongues 5 at opposite ends thereof adapted to be positioned within grooves or pockets 6. Because of the peculiar curvature of the grooves 6 and the tongues 5, it will be observed that when in place, the parts 1 and 3 will be retained against circumferential or lateral separation.

In order to maintain the section 3 in fixed position when applied to the body portion 1, I provide movable locking members preferably of the following construction, it being understood that a plurality of locking members are provided one adjacent each end of the removable section 3, and a description of one of such parts will suffice for the other, they being substantial duplicates. 7 is an elongated locking bar pivotally supported in any desired manner as at 8 for free swinging movement upon the inner surface of the removable section 3 adjacent the end of the latter and substantially midway of the sides of the same. Said locking member has a beveled edge 9, and one or more slots or grooves 10 projecting from said beveled edge inwardly to a point beyond the longitudinal center thereof. Conveniently two grooves are provided as shown, and the said grooves may be straight or curved as illustrated, whereby to more readily engage retaining means, which preferably take the form of headed bolts 11 positioned upon the inner surface of the body portion of the rim 1. These headed bolts may be attached as by welding to the inner surface of the rim 1, though any other means of attachment may be provided, or said retaining means may be integral projections of said rim 1. The locking member 7 is also preferably provided with an auxiliary groove 12 projecting from the beveled edge thereof inwardly to a point beyond the longitudinal center, said grooved portion being adapted to engage a headed bolt 13 conveniently similar in design and construction to the bolts 11, the headed bolt 13 being secured to the inner surface of the projecting tongue 5 of the removable section 3.

The locking members 7 at the free end thereof are provided with a projection 14 forming an offset tool engaging portion 15 to the end that a hammer or suitable tool may be brought into play for releasing the locking member 7 without the possibility of contacting with the engaging portions of said locking members or the headed bolts 11 which might tend to damage the same and thereby interfere with the subsequent application and release of the locking members.

It is believed that the construction and operation of the device is obvious. Assuming that the tire is in place on the rim, and it is desired to remove the same for repair or other purposes, the operator by means of a hammer or other tool, engages the abutment 15 thereby moving the locking devices 7 about their pivotal support 8, which releases said locking members and permits the section 3 to be moved inwardly or out of interlocking engagement with the ends of the body portion of the rim. The section 3 being preferably of considerable length, it will be observed that when removed, the gap in the rim will permit of the tire being readily released from the rim. To replace the tire, the section 3 being detached, the tire may be readily slipped into position over the body portion of the rim. Thereupon, the valve stem is inserted through the aperture 4 of the removable section when such removable section is forced inwardly into interlocking engagement at its ends with the adjacent ends of the body portion of the rim. When thus positioned, the parts of the rim are maintained in place for the easy manipulation of the locking members, which latter are moved about their pivotal supports so as to engage the grooved portions thereof beneath the headed ends of the bolts 11 and 13 respectively. The beveled or sharpened edge of the locking members facilitates the locking engagement with said headed bolts, as will be obvious. The section 3 of the rim when in place coöperates with the body portion 1 thereof so as to provide a substantially solid or continuous rim, and without any likelihood of any accidental separation of these parts when in use. The rim is applied to the ordinary wheel in a manner whereby the usual flange at one side thereof will prevent outward movement of the locking members 7, whereas the inward movement thereof will of course be restricted by the engagement between the bolts 11—13 and locking grooves 10—12.

What I claim is:—

1. A supporting rim for pneumatic tires comprising a main section having a gap, an auxiliary section adapted to fill said gap, said auxiliary section having independently movable pivoted locking bars, and means adjacent each end of the main section adapted to be engaged by said locking bars.

2. A supporting rim for pneumatic tires comprising a main section having a gap, an auxiliary section adapted to fill said gap, said auxiliary section having independently movable pivoted locking bars, means adjacent each end of the main section adapted to be engaged by said locking bars, and an independent interfitting connection between said auxiliary section and said ends of the main section.

3. A tire supporting rim comprising a main strip having a gap and a locking bolt adjacent each end thereof, a detachable section adapted to fill said gap, and pivoted locking bars mounted on the detachable section and having a grooved edge to engage said locking bolts.

4. A tire supporting rim comprising a main strip having a gap and a locking bolt adjacent each end thereof, a detachable section adapted to fill said gap, and pivoted locking bars mounted on the detachable sec tion and having a grooved edge to engage said locking bolts, said locking bars having a tool engaging projection adjacent the free end thereof.

5. In a tire supporting rim comprising a main section constructed to form a gap, an auxiliary section adapted to be positioned in said gap, a locking bolt adjacent each end of the auxiliary section, a locking bolt adjacent each end of the main section, and pivoted locking devices on the auxiliary section adapted to engage said locking bolts to maintain the parts in place.

6. In a tire supporting rim comprising a main section constructed to form a gap, an auxiliary section adapted to be positioned in said gap, a locking bolt adjacent each end of the auxiliary section, a locking bolt adjacent each end of the main section, pivoted locking devices on the auxiliary section adapted to engage said locking bolts to maintain the parts in place, said locking members comprising elongated bars having bolt engaging grooves, and a beveled edge connecting with said grooves.

7. A tire supporting rim comprising a main strip split transversely from edge to edge to form a gap, a locking device adjacent each end of said strip, a detachable section adapted to be positioned in said gap, and laterally movable locking bars mounted on the detachable section and having a grooved edge to engage said locking devices.

8. A tire supporting rim comprising a main strip split transversely to form an unobstructed gap, and a plurality of locking bolts adjacent each end thereof, a detachable section adapted to be positioned in said gap to constitute a prolongation of the main strip, and pivoted locking bars mounted on the detachable section and having one edge with a plurality of grooves to engage said locking bolts.

9. A tire supporting rim comprising a main strip split transversely to form an unobstructed gap, and a plurality of locking bolts adjacent each end thereof, a detachable section adapted to be positioned in said gap to constitute a prolongation of the main strip, and pivoted locking bars mounted on the detachable section and having one edge with a plurality of grooves to engage said locking bolts, and means independent of said bars for connecting said section adjacent opposite ends to the ends of the main strip.

In testimony whereof I affix my signature in the presence of two witnesses.

MAURICE B. KORMAN.

Witnesses:
CALVIN T. MILANS,
M. H. KELLY.